United States Patent [19]

Motisher et al.

[11] Patent Number: 5,081,457
[45] Date of Patent: Jan. 14, 1992

[54] APPARATUS FOR REDUCING SYNCHRONOUS FRUIT IN TCAS SURVEILLANCE SYSTEMS

[75] Inventors: Lewis R. Motisher, Peoria; Gregory T. Stayton, Glendale, both of Ariz.

[73] Assignee: Honeywell Inc., Minneapolis, Minn.

[21] Appl. No.: 444,089

[22] Filed: Nov. 30, 1989

[51] Int. Cl.$^5$ .................................................. G01S 9/56
[52] U.S. Cl. .................................................. 342/40
[58] Field of Search .................. 342/40, 37, 94, 137

[56] References Cited

U.S. PATENT DOCUMENTS

| | | | |
|---|---|---|---|
| 3,705,402 | 12/1972 | Ballantyne et al. | 342/40 |
| 3,887,916 | 6/1975 | Goyer . | |
| 4,008,471 | 2/1977 | Hall et al. . | |
| 4,021,802 | 5/1977 | Litchford . | |
| 4,174,519 | 11/1979 | Poli . | |
| 4,180,815 | 12/1979 | Hill . | |
| 4,219,817 | 8/1980 | Moore et al. . | |
| 4,761,651 | 8/1988 | Matsunaga . | |
| 4,796,030 | 1/1989 | Colotti et al. . | |

FOREIGN PATENT DOCUMENTS 0052081 3/1988 Japan .................................. 342/40

Primary Examiner—Thomas H. Tarcza
Assistant Examiner—Mark Hellner
Attorney, Agent, or Firm—Seymour Levine; Roger W. Jensen; Albin Medved

[57] ABSTRACT

A system wherein TCAS transmissions have two jitter components added to the jitter component utilized in the interscan interval to minimize TCAS interference with ground station operation. The jitter components minimize the establishment of false intruder tracks caused by responses to ground station interrogations or interrogations by other TCAS interrogators which are received in synchronism with the TCAS interrogation signals.

6 Claims, 8 Drawing Sheets

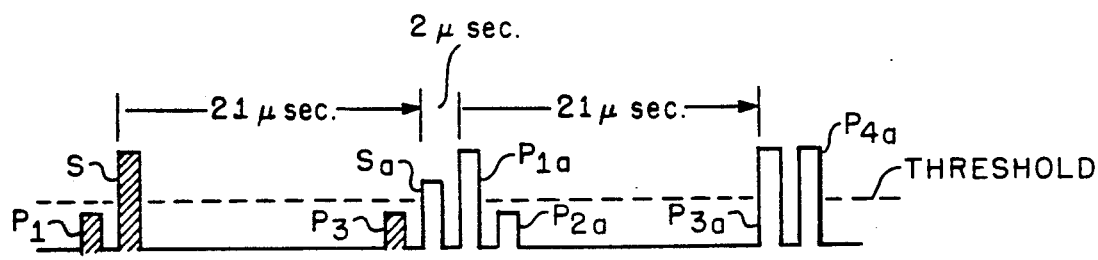
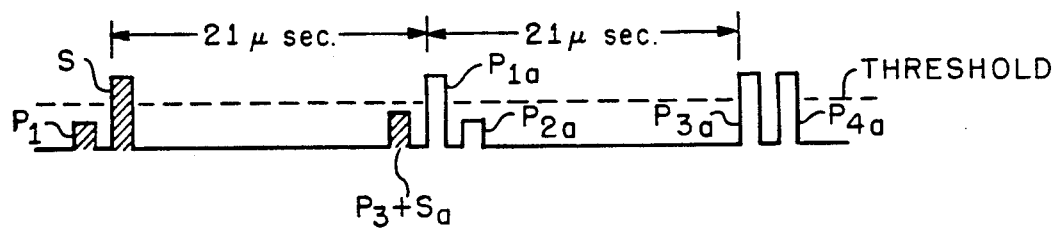
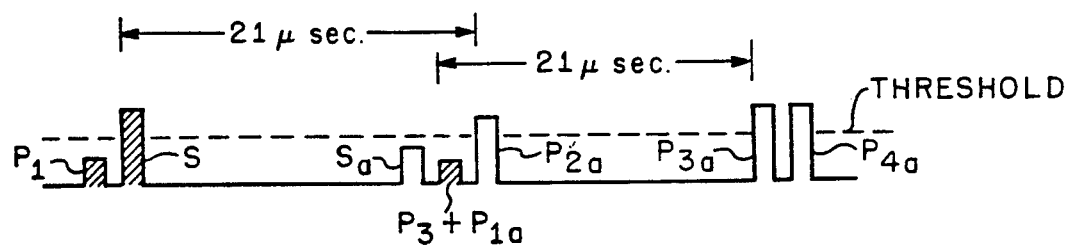
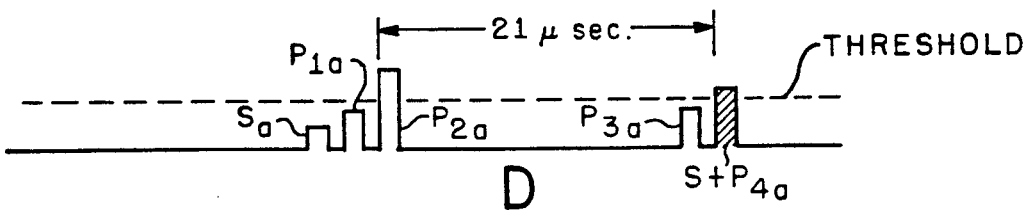
FIG. 4.

APPARATUS FOR REDUCING SYNCHRONOUS FRUIT IN TCAS SURVEILLANCE SYSTEMS

BACKGROUND OF THE INVENTION

1. Field of the Invention

The invention pertains to traffic alert collision avoidance systems and more particularly to such systems that cooperatively function with Air Traffic Control Radar Beacon Systems which provide intruder aircraft radar beacon surveillance.

2. Description of the Prior Art

A Traffic Alert and Collision Avoidance System (TCAS) installed on an aircraft cooperates with Air Traffic Control (ATC) by utilizing ATC Radar Beacon Systems (ATCRBS) transponders installed in most aircraft world wide and the new Mode S Transponders to provide locations of other aircraft in the immediate vicinity of the TCAS equipped aircraft. TCAS provides surveillance within the ATC System by transmitting interrogating signals to the ATCRBS equipped aircraft and measuring the relative range, altitude, and bearing from the responses of the ATCRBS transponder. The measured data and the rate of change of this data are utilized by TCAS to provide a prediction of aircraft penetration into a predetermined TCAS protection volume within a subsequent flight time of approximately thirty seconds. When an aircraft penetration is predicted within this time, an advisory is given to the pilot to climb to a new altitude, maintain its present altitude, or descends from his present altitude.

A problem with this system is that ATCRBS equipped aircraft respond to a non-unique interrogation. Thus, all ATCRBS transponders answer to the same interrogation when detected. Mode-S transponders respond to a unique address and may therefore be individually interrogated. To provide adequate surveillance of ATCRBS equipped aircraft a procedure has been developed that segments the air space in the manner that permits only a limited number ATCRBS equipped aircraft to respond at one time. This procedure, known as Whisper-Shout interrogates aircraft with increasingly stronger signals so that aircraft at short ranges from the interrogating aircraft reply before aircraft located at longer ranges. Copending U.S. patent application Ser. No. 430,747 filed Oct. 31, 1989 by Gegory T. Stayton and assigned to the assignee of this application, incorporated herein by reference, fully describes the Whisper-Shout procedure. ATCRBS transponders reply after two interrogation pulses, spaced twenty-one microseconds apart have been detected. These transponders are designed to suppress a response when two pulses two microseconds apart are detected. To reduce the number of aircraft replying to the TCAS/ATCRBS interrogation signals, a suppression pulse, having an amplitude lower than the interrogation pulse amplitudes, is transmitted two microseconds before the first interrogation pulse, as explained in the aforementioned copending patent application. When an interrogated aircraft is at a range at which the lower amplitude first pulse, the suppression pulse, is not detected, the transponder replies after the reception of the two interrogation pulses. Consequently, as the signal level of the interrogation is increased by the interrogating TCAS for detection by transponders at the longer ranges, the suppression pulse and the first interrogation pulse will be detected at the shorter ranges and the responses from the ATCRBS equipped aircraft at these shorter ranges will be suppressed.

Replies of all transponders are detected by the TCAS receiver, whether triggered by the TCAS interrogator associated with that receiver, other TCAS interrogators, or by ground station interrogators. Detected replies triggered by interrogators other than the one associated with the detecting receiver, commonly referred to as "fruit", if synchronous with the interrogation transmissions of the interrogator associated with the receiver may cause the system to establish false target tracks. This may occur if, in three successive interrogation intervals, replies are received that match within one-third of a nautical mile (4.12 microseconds). Synchronous detections of responses triggered by interrogators other than that associated with the receiver may most likely occur in five known situations;

a. A ground station triggers replies from an intruder transponder which are detected by the receiver associated with the interrogator of interest. The ground station interrogator is transmitting pulses at a K millisecond repetition interval, while the interrogator of interest is transmitting pulses at a L millisecond repetition interval. When multiple ground stations interrogate an area, triggered responses to these interrogations may give rise to fruit synchronous with pulse repetition rate of the interrogator of interest.

b. Interrogating ground stations generally employ techniques to suppress responses to signals radiated on a side lobe of the system antenna. Some military ground stations, however, do not have such side lobe suppression transmission. Consequently, a transponder in close proximity to these ground stations will detect and reply to the side lobe radiated interrogating signals. These replies may increase the number of possible synchronous fruit detections by as much as twenty-five times.

c. Modern transponders are equipped with circuitry to detect the sidelobe suppression signals radiated by an interrogating station and to suppress responses to these interrogations when suppression pulses are detected. A transponder having side lobe suppression circuitry not operating may have the same effect as interrogator transmissions without side lobe suppression pulses.

d. TCAS interrogations are transmitted as a sequence of five (5) pulses which include a suppression pulse, of amplitude less than the interrogation pulses, transmitted two microseconds before the first interrogation pulse which, after twenty-one microseconds, is followed by a second interrogation pulse. Transponders not detecting the suppression pulse will respond to the interrogation after detecting the two twenty-one microsecond separated interrogation pulses. A pulse from any other TCAS interrogator, whether airborne or ground based, may be detected with twenty-one microsecond spacings between it and a detected suppression pulse, the first interrogation pulse, or the second interrogation pulse from the interfering interrogator thereby causing a response from the transponder in synchronism with transmitted interrogations. These replies will be given 19 microseconds, twenty-one microseconds, or twenty-three microseconds early. If these replies persist, false tracks of 1.55 nmi, 1.71 nmi, and 1.87 nmi closer in range will be generated. The most likely source of an interfering pulse is a side lobe suppression pulse from a ground station, which is transmitted two microseconds after the transmission of the first interrogation pulse.

e. As explained in the aforementioned copending application, it is possible in certain angular sections about the interrogating aircraft, for the suppression pulse from the interrogator of interest to have an amplitude that exceeds the amplitudes of the two interrogation pulses. It is therefore possible to generate a response when an interfering pulse is received twenty-one microseconds after this suppression pulse. The detection of the suppression pulse from the interrogator of interest and the interfering pulse produces a synchronous fruit reply two microseconds or 0.16 nmi after a reply that would have been received from a transponder replying to an interrogation from the interrogator of interest.

Situations similiar to those described above may also occur due to interference from TCAS interrogations from sources than the ground station interrogators. All of the above situations will be more fully explained during the description of the preferred embodiments.

SUMMARY OF THE INVENTION

In accordance with the present invention an interrogator of a threat surveillance system provides first pseudo-random variable time intervals between interrogation cycles transmitted by an interrogator in a manner such that receiver range gates of an interrogation cycle do not overlap the receiver range gates of the preceding interrogation cycle. This range gate jittering significantly reduces synchronous fruit established by intruder aircraft transponder replies to interrogations from ground stations. A second pseudorandom variable delay between interrogation signal cycles provides a jitter to the time locations of the correlations windows within the range gate so that responses to interrogations from ground stations or other TCAS interrogations which, even with the range gate jittering, occur in more than one range gate, do not occur in corresponding correlation windows. Since replies must occur within a correlation window of a range gate for three successive interrogation cycles a second reduction of synchronous fruit replies is realized with this second pseudorandom intercycle delay.

The invention will be described more fully by way of example with reference to the accompanying drawings.

BRIEF DESCRIPTION OF THE DRAWINGS

FIG. 4 illustrates various combinations of signal receptions by a transponder which may result in synchronous fruit at a TCAS receiver.

DESCRIPTION OF THE PREFERRED EMBODIMENTS

Figure 1:
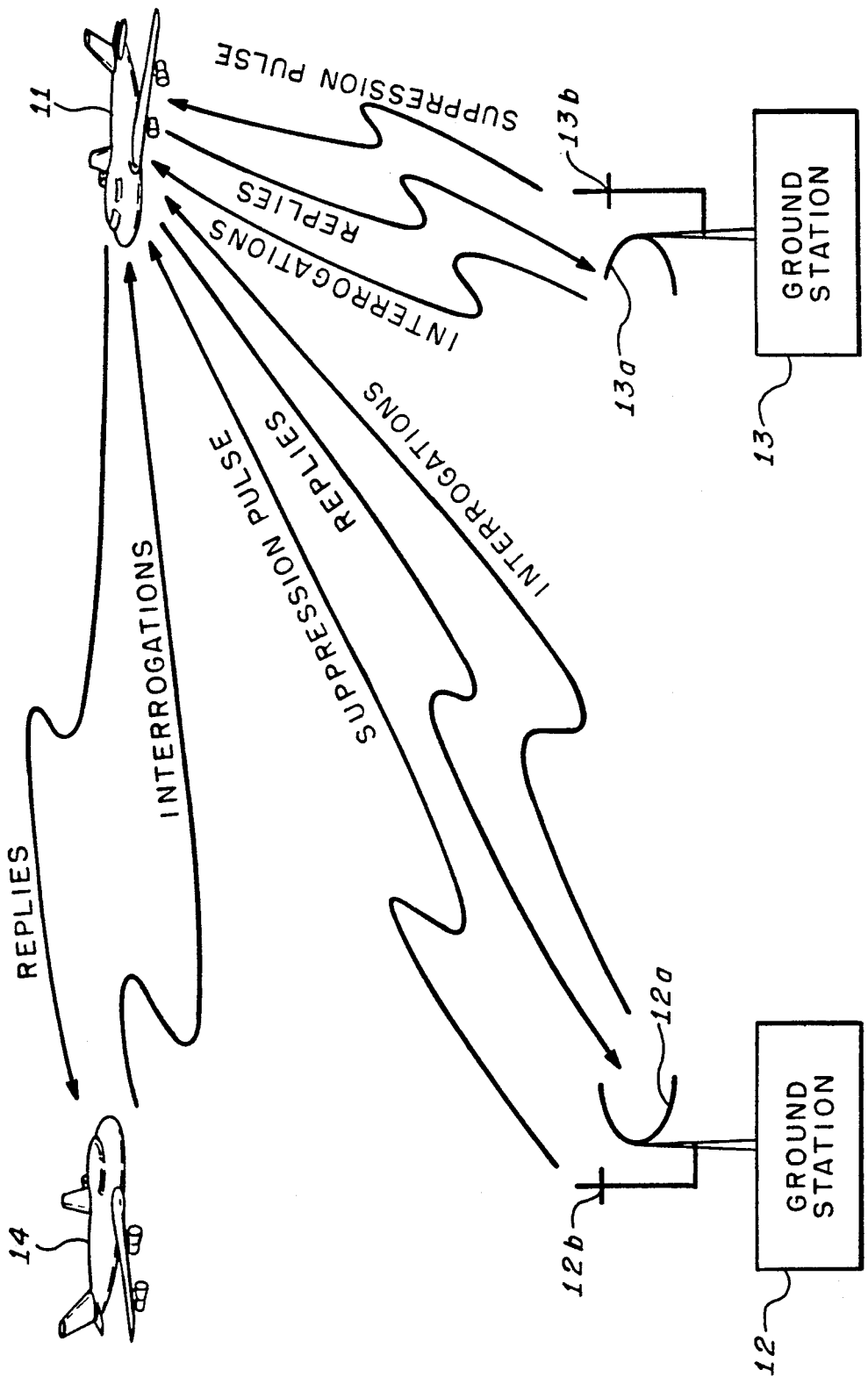
FIG. 1 is a diagram indicating the plurality of interrogation signals to which a ATCRBS may respond.

Refer to FIG. 1 wherein an air traffic control radiation environment is shown. An ATCRBS transponder on an aircraft 11 receives interrogation signals from scanning antennas 12a and 13a located at ground stations 12 and 13, respectively. After the transmission of the interrogation signals side lobe suppression pulses are radiated from only directional antennas 12b and 13b associated with the scanning antennas 12a and 13a, respectively. In addition to these interrogation signals and suppression pulses, the transponder on the aircraft 11 receives interrogation signals from TCAS on an aircraft 14. Replies to these interrogation signals are transmitted on a very broad beam and are all therefore available for detection by a receiver associated with each interrogator. Interrogation signals from an aircraft 14 are arranged to enable the ground stations 12 and 13 to ignore responses from transponders on an aircraft 11 resulting from interrogations from the aircraft 14. In general, responses from the aircraft 11 to ground stations 12 and 13 interrogations are not synchronous with interrogation transmissions from the aircraft 14. Situations may exist, however, wherein transmissions from a ground station, or a multiplicity of ground stations, and responses to these interrogations may establish a sequence of signals at the receiver on the aircraft 14 which are in synchronism with the interrogation signals transmitted from that aircraft. How this may occur will be explained With reference to FIGS. 2,3, and 4

Figure 2:
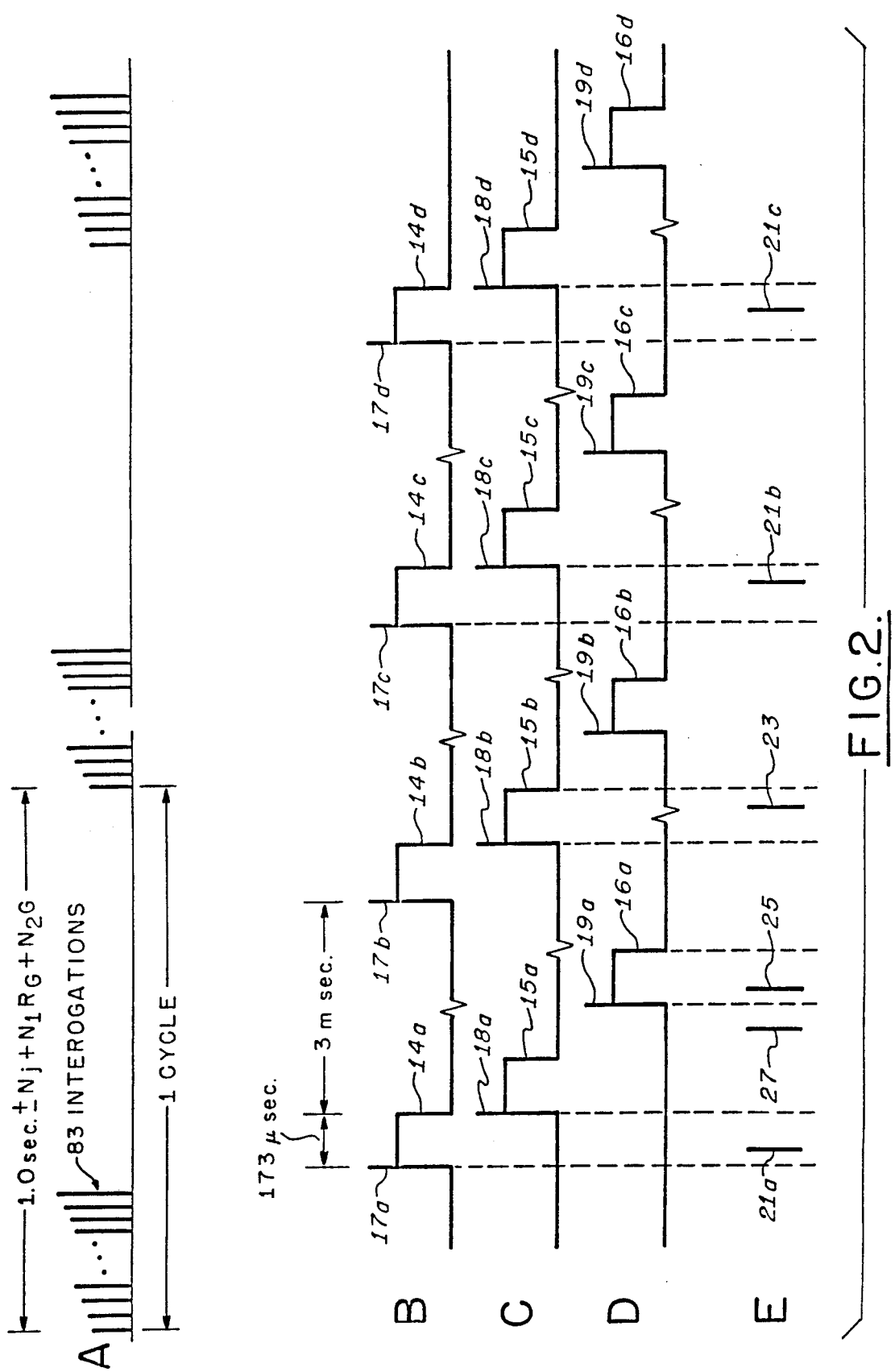
FIG. 2 is a representation of TCAS transmissions and receiver range gates useful for explaining the invention.

A number of interrogation cycles from a TCAS interrogator is shown at "A" in FIG. 2. Each interrogation cycle includes one hundred and eighty-three interrogation transmissions of increasing amplitude (whisper-shout), as explained in the aforementioned copending patent application, a spacing of three (3) msec between each interrogation, and a delay period from the completion of the last one hundred and eighty-three interrogations before the commencement of a subsequent one hundred and eighty-three interrogations of the next cycle. Each cycle period is nominally equal to one second which is jittered in integral multiples of one hundred milliseconds ($N_j$) to prevent the TCAS from interfering with ground station surveillance. The $N_j$ jitter, however, does not significantly reduce the synchronous fruit established at the TCAS receiver. Reduction of the synchronous fruit at the TCAS receiver is accomplished by providing of two additional jitters $N_1 R_G$ and $N_2 G$, where $N_1$ and $N_2$ are pseudo random numbers, $R_G$ is the range gate time interval and G is the time width of a correlation window. These two additional jitters in the interrogation transmission cycle will be discussed subsequently. At B, C, and D of FIG. 2 are shown range gates 14 a–d, 15 a–d, and 16 a–d of three interrogation cycles, each respectively generated in response to interrogation transmissions 17 a–d, 18 a–d, and 19 a–d. The cycle C has been jittered to displace its range gates by one range gate interval from that of cycle B, while cycle D has been jittered to displace its range gates by two range gate intervals relative to the cycle B. At E vertical lines represent signals received at the TCAS due to responses by threat aircraft to interrogations from other TCAS interrogators and from ground station interrogations. Signals 21a, 21b, and 21c are within range gates of the first cycle, signal 23 is within a range gate of the second cycle, and signal 25 is within a range gate of the third cycle, while signal 27 is not within any range gate of the three cycles. TCAS establishes tracks when replies are received that correlate to within 4.125 microseconds (0.333 nautical miles) in each of three successive interrogation cycles. Consequently, for the situation shown at E in FIG. 2 TCAS will not establish a track. In this situation only the signals 21a and 25 correlate, but this correlation exists only for cycles B and D, there is no signal correlation in cycle C.

Figure 3:
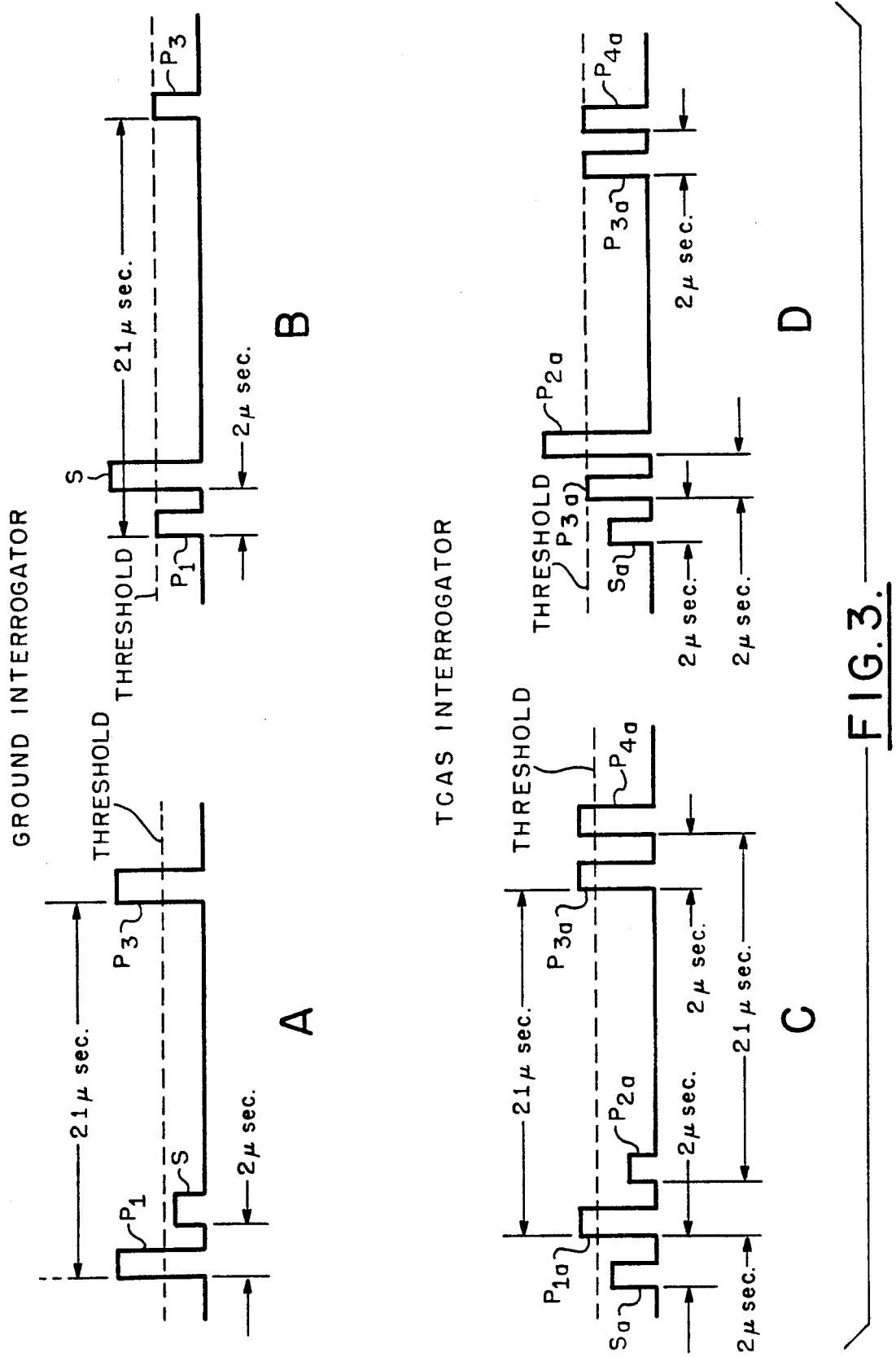
FIG. 3 illustrates the interrogation signals from a ground station and a TCAS.

An interrogation pulse sequence of a ground interrogator is shown at A in FIG. 3. The sequence includes first $P_1$ and second $P_3$ interrogation pulses transmitted twenty-one microseconds apart from a ground station scanning antenna and a suppression pulse S transmitted on an omnidirectional antenna two microseconds after the transmission of the first interrogation pulse. A transponder will transmit a reply when two pulses twenty-one microseconds apart are detected, while responses will be suppressed when two pulses two microseconds apart are detected. Consequently, a response to an interrogation signal will be provided when P1 and P3 exceed a receiver threshold of the transponder while the suppression pulse S does not as shown at A in FIG. 3. A response will be suppressed at the situation shown at B in FIG. 3 exists. In this situation the suppression pulse exceeds the threshold. Thus providing the situation where two signals are detected two microseconds apart or only one signal is detected and a second is not detected at twenty-one microseconds thereafter.

A TCAS interrogation signal sequence is shown at C in FIG. 3. This sequence includes five pulses, first and second interrogation pulses $P_{1a}$ and $P_{3a}$ spaced twenty-one microseconds apart, a first suppression pulse $S_a$, a second suppression pulse $P_{2a}$ and a Mode-S suppression pulse $P_{4a}$. The purposes and transmission patterns for the signals $S_a$, $P_{2a}$, and $P_{4a}$ are fully described in the aforementioned copending application. At D in FIG. 3 is shown a signal situation at a transponder wherein the suppression pulse $P_{2a}$ exceeds the transponder receiver threshold thereby suppressing replies. A full description of transponder operation in response to signal detections in the five pulse sequence is provided in the aforementioned copending application.

Four illustrations of signal detection situations which give rise to erroneous synchronous responses to a transponder interrogation is shown in FIG. 4 at A, B, C, and D. At A is shown a situation wherein a ground interrogator suppression pulse S and the first suppression pulse $S_a$ are detected by a transponder twenty-one microseconds apart. After the detection of the second pulse $S_a$ the receiver is disabled for 35 microseconds and the first interrogation pulse $P_{1a}$, which arrives two microseconds after the first suppression pulse $S_a$, is not detected even though it exceeds the threshold. This situation provides a response that is twenty-three microseconds earlier than that which would have occurred by the detection of the two interrogation pulses $P_{1a}$ and $P_{3a}$. A signal condition which triggers a false response from a transponder twenty-one microseconds before a true response is shown at B in FIG. 4. In this situation a suppression pulse from a ground station interrogation sequence exceeds the transponder receiver threshold and the second ground station interrogation signal coincides with the first TCAS suppression signal with a phase relative to that of first TCAS suppression signal to establish a sum of the signals that does not exceed the transponder threshold. In this situation the detection of the ground station suppression signal S and the first TCAS interrogation signal $P_{1a}$ twenty-one microseconds apart triggers the early response.

A third signal situation which causes an erroneous response is shown at C in FIG. 4. In this situation a second interrogation pulse $P_3$, transmitted from the ground station, coincides with the first interrogation pulse $P_{1a}$, the two signals adding with relative phasing to provide a resultant signal below the threshold, while the ground station's suppression signal S and the second interrogator suppression pulse $P_{2a}$ exceed the threshold and are detected twenty-one microseconds apart. Since the TCAS second suppression signal $P_{2a}$ is transmitted nineteen micro seconds before the second TCAS interrogation pulse $P_{3a}$, a response is triggered nineteen seconds before a true response would have been triggered if the first TCAS interrogation pulse $P_{1a}$ and the second interrogation pulse $P_{3a}$ had been detected without the detection of any of the suppression pulses.

A fourth erroneous response may be triggered by the signal situation shown at D in FIG. 4. In this situation the second TCAS suppression pulse $P_{2a}$ is detected and the ground station suppression pulse S coincides with the Mode-S suppression pulse $P_{4a}$, the two signals combining to provide a signal exceeding the threshold twenty-one microseconds from the detection of the second suppression pulse $P_{2a}$, all other signals being of an amplitude that do not exceed the TCAS transponder receiver threshold. Since the second TCAS suppression pulse $P_{2a}$ and the Mode-S suppression pulse $P_{4a}$ are transmitted two microseconds after the first and second TCAS interrogation pulses $P_{1a}$ and $P_{3a}$, respectively, the response to the signal detections arrives at the interrogator two microseconds after a response would have been received had the transponder detected the interrogation pulses $P_{1a}$ and $P_{3a}$ without detecting any of the suppression pulses.

It should be apparent from FIG. 4 that transponder replies in response to the signal situations at A, B, and C, which are established by the interference of multiple ground stations with a TCAS interrogation signals, established three synchronous replies within a 4.125 microsecond correlation window. These synchronous replies can cause the TCAS to establish a false track for a close - in fictitious target.

As used herein an interrogation pulse sequence is the series of five (5) pulses transmitted by the transponder as the interrogation signal, an interrogation scan is equal to 83 interrogation pulse sequence transmissions, and an interrogation cycle is an interrogation scan plus an interscan interval.

As previously discussed, TCAS interference with ground station operations is minimized by jittering the one second interinterrogation scan interval by pseudo-random integral multiples of one millisecond. This jittering does not significantly reduce the synchronous fruit at the TCAS receiver generated as described above. Reduction of this synchronous fruit may be accomplished by providing two additional jitters to the interscan interval. The first jitter provides range gates in an interrogation scan that do not overlap corresponding range gates in the previous scan, in this manner, any synchronous replies in a range gate of one interrogation scan will not be detected in a corresponding range gate of the other interrogation scan. The second additional jitter varies the interscan interval by pseudo-random multiples of a correlation widow, which may be 4.12 microseconds, used to form tracks of intruder aircraft. In addition to the minimization of synchronous fruit, the two additional jitters minimize false tracks due to synchronous system noise inherent in the TCAS receivers and processors which may produce false non-altitude reporting replies and cause non-altitude reporting tracks without the additional two jitters.

Figure 5:
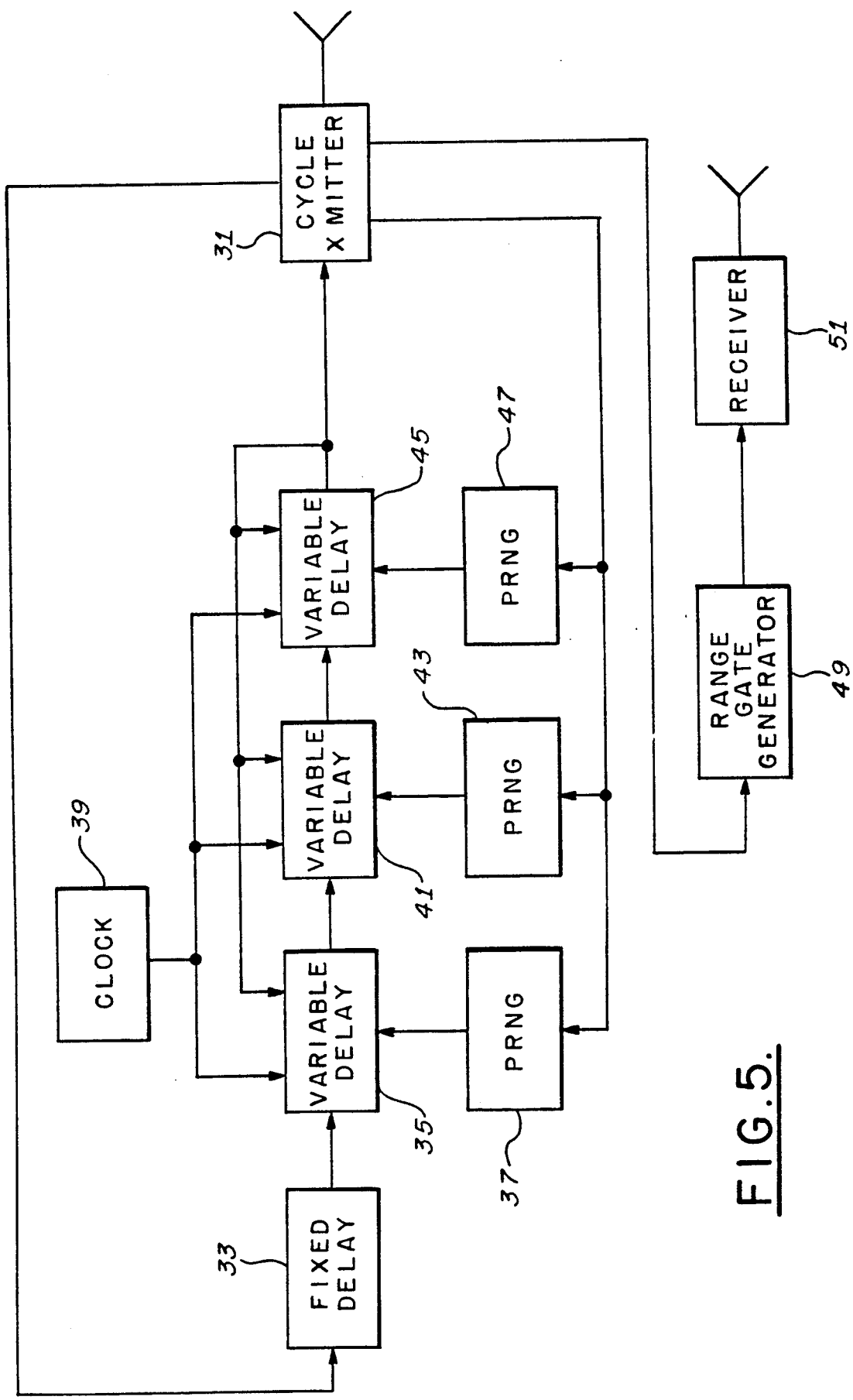
FIG. 5 is a block diagram of a circuit capable of implementing the invention.

Refer now to FIG. 5 wherein a block diagram of an interrogation scan interval generator which may be employed to jitter the interrogation scan intervals and provide a scan period in accordance with $$\text{SCAN PERIOD} = 1.0 \text{ sec} \pm N_j \pm N_1 \cdot R_G \pm N_2 \cdot G$$

where; $N_j$ is the jitter for minimizing ground station interference by the TCAS which may vary between 0 and 100 msec; $N_1$ is a pseudo-random number; $R_G$ is the length of a range gate which may be 173 microseconds to receive responses from aircraft within a 14 mile radius; $N_2$ is a second pseudo-random number; and G is the width of a correlation window which may be 4.12 microseconds. After 83 interrogation pulse sequences have been generated in a cycle transmitter 31 of the interrogator, a pulse is applied to a fixed delay line wherein it may be delayed for 345 msec and applied to a variable delay line 35, which may be a countdown counter of the type well known in the art. The countdown for the variable delay 35 is set by a pseudo-random number generator 37 which may be triggered to provide a new pseudo-random number for the countdown by a pulse provided from the cycle transmitter 31 with the generation of the first pulse of an interrogation pulse sequence. The counter 35 is enabled by the pulse coupled from the fixed delay 33 and is clocked to count down from the pseudo-random number provided by the pseudo-random number generator (PRNG) 37 by a clock 39. The PRNG 37 and the clock 39 are arranged to provide a psuedo-random delay that is between 0 and 200 milliseconds from the time the counter 35 is enabled by the pulse coupled from the fixed delay 33. Since the time required to transmit 183 interrogation pulse sequences is 0.555 seconds, delays provided by the combination of the fixed delay 33 and the variable delay 35 provides an interrogation cycle period that is between 0.9 and 1.1 seconds.

Output pulses from the variable delay 35 are coupled to a second variable delay 41, which may be a countdown counter having the countdown number set by a PRNG 43 triggered to provide a new pseudo-random number by the pulse in the cycle generator 31 at the start of an interrogation sequence. Counter 41 is enabled by the pulse from the variable delay 35 and is clocked by pulses from the clock 39 to count down from the number set by the PRNG 43. When the countdown is completed, the counter 41 provides a pulse at a time after the enabling pulse from the variable delay 35 that is equal to the number set from the counter 41 by the PRNG 43 times 173 microseconds, which is the width of a range gate for a 14 nautical mile surveillance. The output pulse from the variable delay 41 is coupled to enable a third variable delay 45 which has a countdown number set by a PRNG 47 and is clocked by pulses from clock 39. The pulses provided by the clock 39 and the number provided by the PRNG 47 cause counter 45 to provide a pulse at a time after the counter 45 has been enabled that is equal to an integral multiple of 4.12 microseconds which is the width of a correlation window. The pulse provided by the variable delay 45 is coupled to the cycle transmitter to initiate the next interrogation pulse sequence and is further coupled to reset the three countdown counters. When the first pulse of the new interrogation pulse sequence is generated, a trigger pulse is coupled to the PRNGs 37, 43, and 47 to load new delay multiplying numbers into the countdown counters 35, 41, and 45. In the usual manner, at the completion of the interrogation pulse sequence, a trigger is provided by the cycle transmitter 31 to a range gate generator 49, which in turn provides a range gate to enable the receiver over the range gate time interval.

Figure 6:
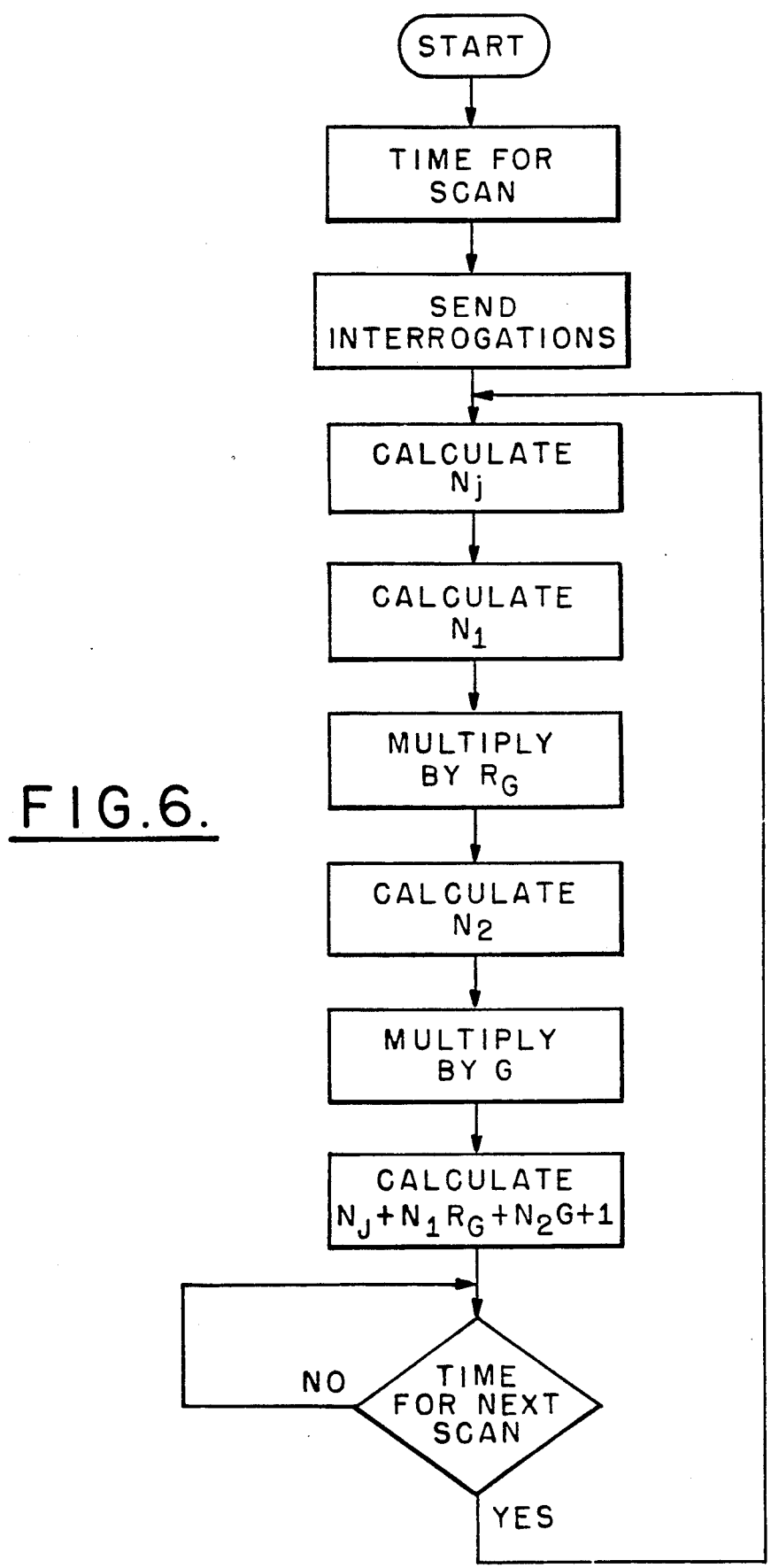
FIG. 6 is a flow chart of processes and decisions for implementing the invention.
Figure 7:
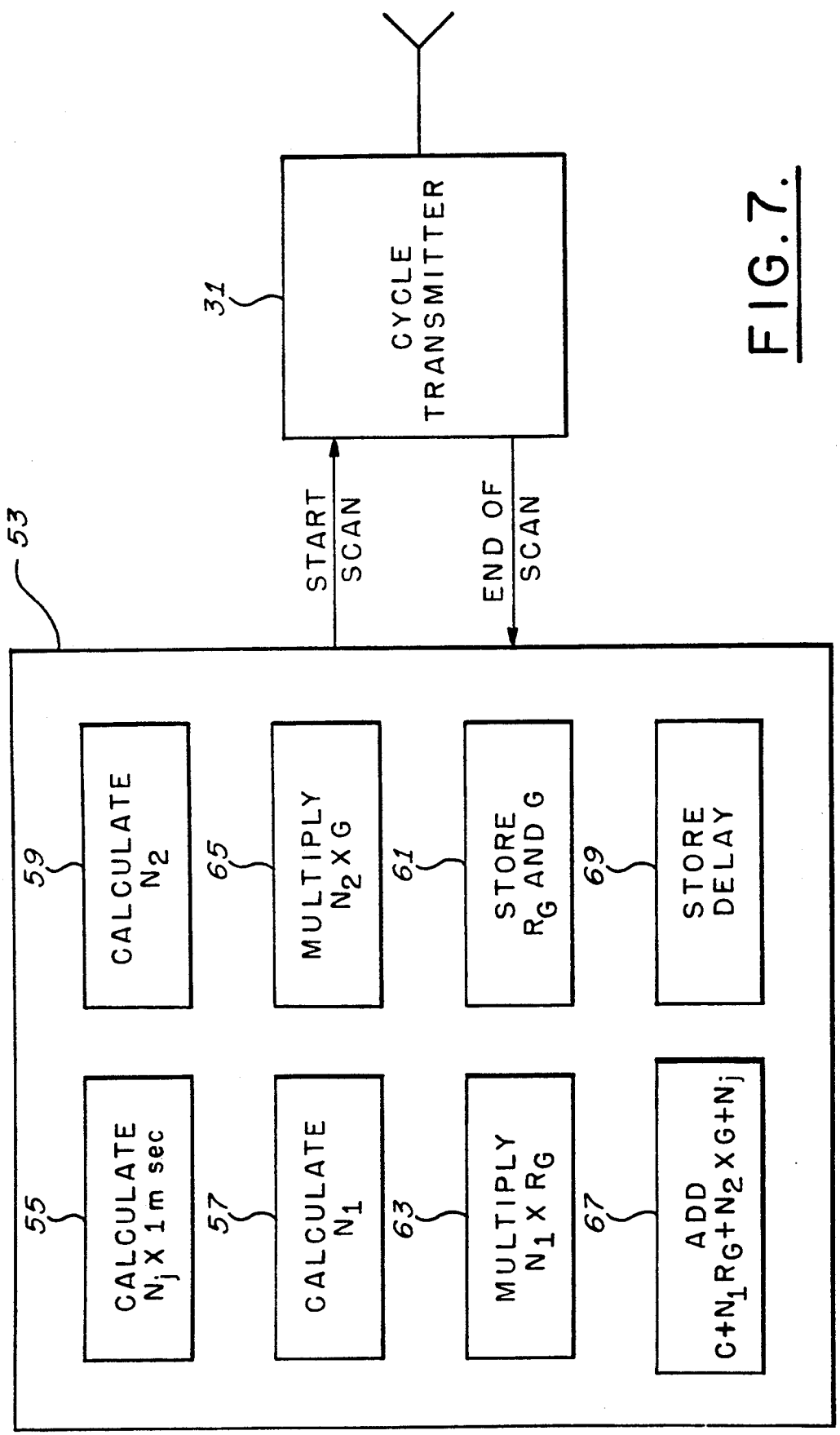
FIG. 7 and FIG. 8 show an alternated preferred embodiment of the invention.

In another preferred embodiment of the invention the pseudo-random jittering of the interinterrogation pulse sequence may be provided through software applied to a computer. A flow chart for accomplishing this is shown in FIG. 6 and a block diagram of such a system is shown in FIG. 7. Though a specific order of random number calculations is shown in FIG. 6, it should be recognized that this order may be varied Without affecting the delay jittering. Referring to FIGS. 7, the cycle transmitter 31 provides a pulse to a computer 53 at the end of an interrogation scan (83 interrogation pulse sequences) and receives a start pulse for the next interrogation scan from the computer 53. With the reception of the end of scan pulse from the cycle transmitter 31 the computer 53 calculates new pseudo-random numbers in pseudo-random number sub-routines 55, 57, and 59 which respectively correspond to the pseudo-random numbers $N_j$, $N_1$, and $N_2$. The pseudo-random numbers calculated in sub-routine 57 and the range gate interval stored in memory 61 are multiplied in sub-routine 63, while the pseudo-random number and the correlation window interval G are multiplied in sub-routine 65. The pseudo-random delays provided by a sub-routine 55 and a multiplying sub-routine 63 and 65 are added in a sub-routine 67 to a constant delay C and the result of the addition is stored in the memory 69. When the computer 53 receives the next end-of-scan pulse from the cycle transmitter 31 a pulse is provided by the computer to the cycle transmitter at a time after the reception at the end of scan pulse that is in accordance with the delay stored in the memory 69. At the same time the computer commences the calculation of the delay of the next interrogation scan.

Figure 8:
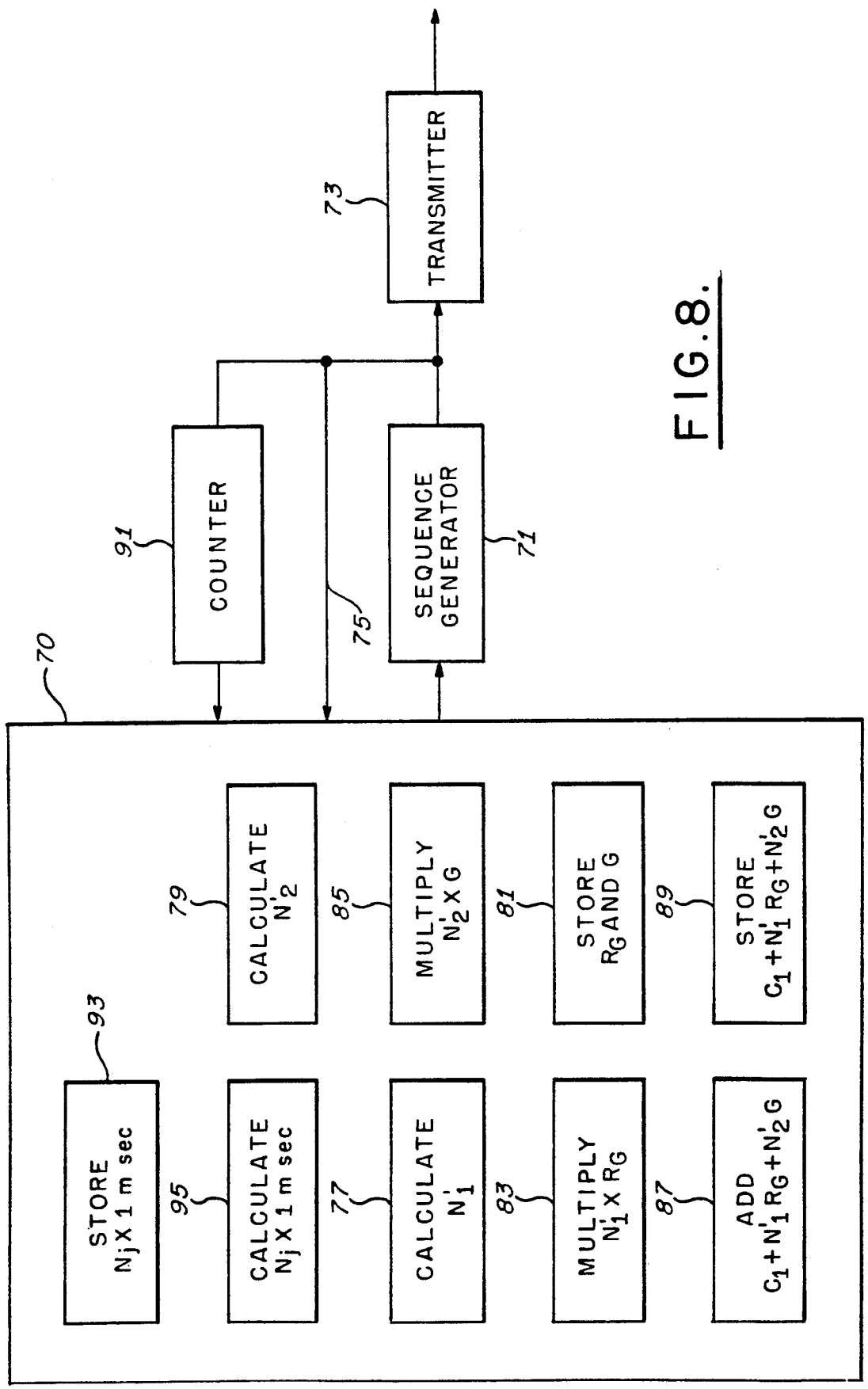

Though, as described above, the range gate and correlation window jittering is applied to the interval between 83 interrogation pulse sequences, it should be recognized that variable delays may be applied between interrogation pulse sequences to accomplish the desired jittering. This type of jittering may be accomplished with the computerized systems shown in FIG. 8. A pulse from a computer 70 triggers a sequence generator 71 which provides the interrogation pulse sequence to a transmitter 73 for transmission. The last pulse of the interrogation pulse sequence is coupled to the computer via a line 75 and initiates the calculation of the range gate and correlation window delay jittering to be applied to the three millisecond delay between interrogation pulse sequences. This is accomplished in a manner similar to that described with respect to FIG. 7. Sub routines 77 and 79 calculate the pseudo-random numbers $N_1$, and $N_2$, which respectively multiply the range gate interval $R_G$ in the correlation window interval G stored in a memory 81 in multipliers 83 and 85. The results of the multiplications are added in sub-routine 87 to a constant delay $C_1$ to provide a delay that is jittered about the nominal three millisecond interinterrogation pulse sequence interval and stored in memory 89. When the sequence conclusion pulse is received from line 75, the computer provides a trigger pulse at a time after receiving the pulse on line 75 that is in accordance with the delay stored in memory 89. With each interrogation sequence transmitted, a counter 91 is incremented until 83 counts are achieved, whereafter a signal is provided to the computer 70 which inhibits the generation of a pulse for the initial interrogation sequence in the interrogation scan for the time interval stored in memory 93.

The pulse from counter 91 also initiates the calculation of the inter-scan interval in sub-routine 95 which is thereafter stored in memory 93 for application at the next interscan interval.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. A threat surveillance system wherein a range gate is generated to activate a receiver in response to a transmission of an interrogation signal, a preselected number of interrogation signals plus a reception interval establishing an interrogation-reception cycle and wherein the receiver establishes a track for a threat when a plurality of signals are received from transmissions of a plurality of interrogation-reception cycles in a predetermined number of range gates at times from starts from said range gate which are within a preselected time window, characterized in that transmissions of interrogation signals for successive interrogation-reception cycles are delayed in a manner to establish variable time displacements between range gates of successive interrogation-reception cycle transmissions, each delay being an integral multiple of a range gate interval.

2. The threat surveillance system of claim 1 further characterized in that said transmissions are further delayed to establish variable time displacement between corresponding time windows in said range gates.

3. A method for reducing false target tracking in a threat surveillance system of the type having a cycle transmitter which repetitively transmits cycles of interrogation signals with variable time delays between cycles and a receiver which is activated in response to a transmission of an interrogation signal for a predetermined time interval comprising the steps of:

establishing first time delays which are integral multiples of said predetermined time interval, said multiples being pseudo-random numbers; and delaying transmission of an interrogation signal cycle upon completion of a preceding interrogation signal cycle by an additional delay that is in accordance with one of said first time delays.

4. A method in accordance with claim 3 further including the steps of establishing second time delays which are pseudo-random multiples of a second predetermined time interval and adding one of said second time delays and said one of said first time delays to establish an intercycle interval and delaying transmission of an interrogation signal cycle after transmission of a preceding interrogation signal cycle by said intercycle interval.

5. A threat surveillance system wherein a range gate having a predetermined time interval is generated to activate a receiver in response to a transmission of an interrogation signal, a preselected number of interrogation signals and a reception interval establishing an interrogation-reception cycle, each interrogation-reception cycle having an intracycle time interval, intracycle time intervals being variable between interrogation-reception cycles comprising:

means coupled to said transmitter for providing signals representative of pseudo-random numbers;

means responsive to said signals representative of said pseudo-random numbers for adding a first time delay, which is a multiple of said range gate time interval, to an intracycle time interval.

6. A threat surveillance system in accordance with claim 5 wherein said receiver establishes a track for a threat when a plurality of signals are received in a predetermined number of range gates at times from starts of said range gates which are within a preselected time window and further comprising means responsive to said signal representative of psuedo-random numbers for adding a second signal to said intracycle time interval that is a multiple of said time window.

* * * * *